(12) United States Patent
Winters et al.

(10) Patent No.: US 9,375,666 B2
(45) Date of Patent: Jun. 28, 2016

(54) PLEATABLE FILTER MEDIA

(71) Applicant: Southern Felt Company, Inc., North Augusta, SC (US)

(72) Inventors: Eric Winters, North Augusta, SC (US); John Lewis, Evans, GA (US); Brian Fields, North Augusta, SC (US); Edward D Andrew, Dinckley (GB)

(73) Assignee: Southern Felt Company, Inc., North Augusta, SC (US)

( * ) Notice: Subject to any disclaimer, the term of this patent is extended or adjusted under 35 U.S.C. 154(b) by 161 days.

(21) Appl. No.: 14/065,778

(22) Filed: Oct. 29, 2013

(65) Prior Publication Data
US 2015/0114230 A1 Apr. 30, 2015

(51) Int. Cl.
*B01D 39/16* (2006.01)
*B01D 46/52* (2006.01)
*B01D 46/00* (2006.01)

(52) U.S. Cl.
CPC ........ *B01D 39/1623* (2013.01); *B01D 46/0001* (2013.01); *B01D 46/521* (2013.01); *B01D 2239/0216* (2013.01); *B01D 2239/064* (2013.01); *B01D 2239/10* (2013.01)

(58) Field of Classification Search
CPC .. B01D 46/01; B01D 46/521; B01D 39/1623; B01D 2239/10; B01D 2239/64; B01D 2239/216

USPC .................. 55/486, 521, 528; 96/15; 156/148
See application file for complete search history.

(56) References Cited

U.S. PATENT DOCUMENTS

| | | | |
|---|---|---|---|
| 2004/0211163 A1* | 10/2004 | Faulkner .............. | B01D 39/163 55/486 |
| 2006/0154548 A1* | 7/2006 | Sheehan .................. | A61Q 1/14 442/411 |
| 2006/0242933 A1* | 11/2006 | Webb et al. ..................... | 55/486 |
| 2008/0230464 A1* | 9/2008 | Winstrup et al. ............. | 210/243 |
| 2011/0265312 A1 | 11/2011 | Choi et al. | |

* cited by examiner

*Primary Examiner* — Jason M Greene
*Assistant Examiner* — Karla Hawkins
(74) *Attorney, Agent, or Firm* — Lisa J. Moyles; Janelle A. Bailey

(57) ABSTRACT

This invention is directed to a filter media for manufacturing pleated filters comprising a non-woven, needle punch felt including a blend of a first polyester fiber and a bi-component fiber wherein said bi-component fiber has a sheath and a core wherein said sheath has a melting point above 110° C. and said nonwoven felt has an efficiency of greater than 89% for particles size of 3 to 10 μm as determined by testing method ASHRAE 52.2. The invention can include a top portion and a bottom portion manufactured from a web made from a carding process that is cross lapped, cut and overlapped so that said top portion and said bottom portion are entangled by a needle punching process to create a homogeneous arrangement prior to applying heat and pressure to stiffen the media for pleating.

18 Claims, 7 Drawing Sheets

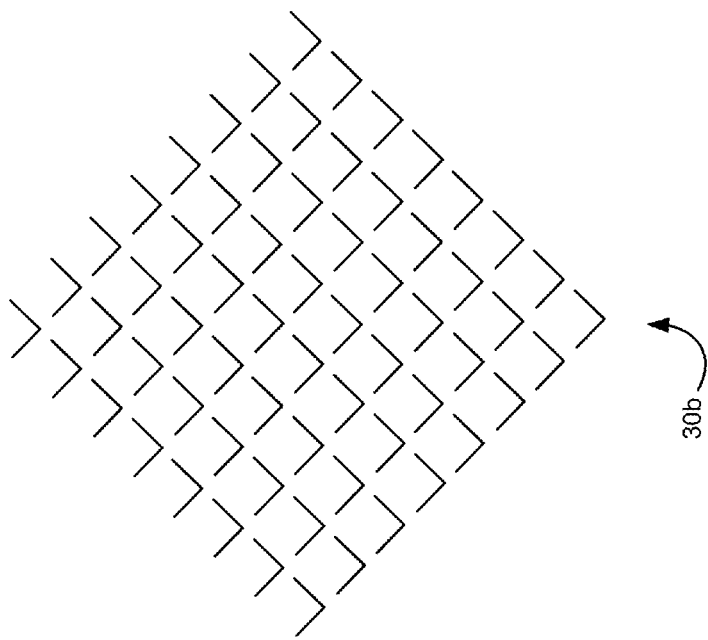
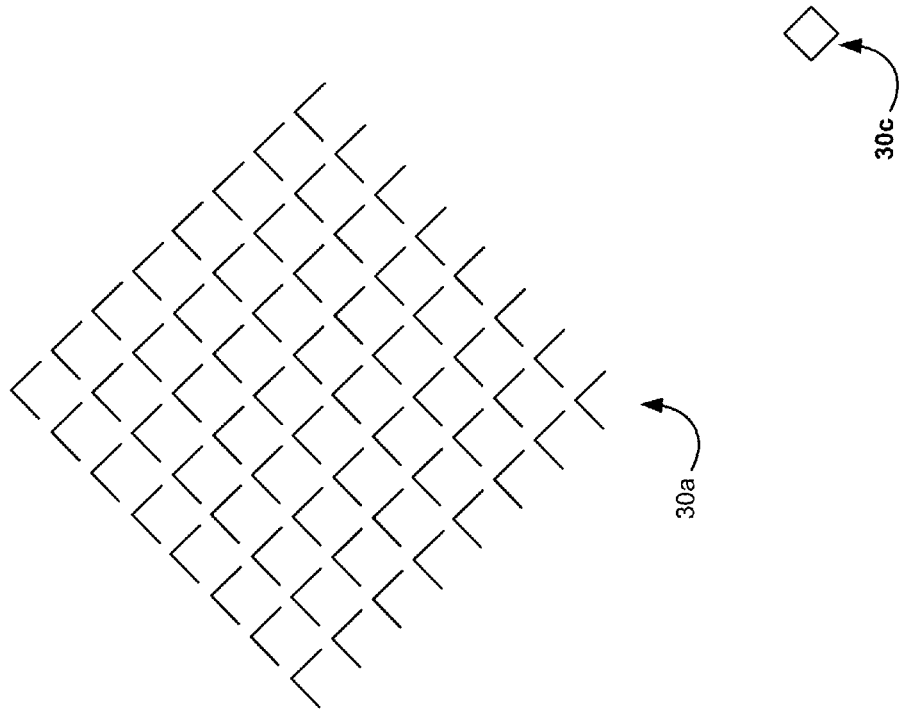
Fig. 4

PLEATABLE FILTER MEDIA

FIELD OF THE INVENTION

This invention is directed to an improved filter media for manufacturing non-woven pleated filters.

BACKGROUND OF THE INVENTION

Filters are used to remove undesirable particles from a gas or fluid stream. For example, air filters are used to remove undesirable or needless particles which have become blended with the air. Industries and uses for filters include cement kilns, locations with furnaces, food processing, wood working, textiles, chemical plants and process, combustion engines, foundries, coal fired power plants and the like.

There are several designs of filters with one major distinction being between a flat surfaced filter and a pleated filter. A flat filter more easily clogs, has less surface area to trap particles. Further, pleated filters can be used to make a pleated filter cartridge which, along with other advantages, has lower pressure drop than that of wound, spun, melt blown or resin bonded designs. However, not all filter media is suitable to be pleated. To overcome this problem, some attempts have been made to produce a pleatable non-woven fabric such as U.S. Pat. No. 6,485,811. However, this reference attempts to thermally compressively bond the layers to form the filter media. By its own admissions, this reference states that "delamination is liable to occur at the center of the thickness." To overcome this issue, this reference states that it thermally compressively bonds layers to provide for a plurality of compressively bonded portions dotted by embossing. However, this reference does not provide for a homogeneous filter media, rather it provides provide one of several layers.

In certain manufacturing and other environments, particles in the air can be of sufficient particle size and proper combination to provide an undesirable combustive environment. Coal, sawdust, sugar, pollen, flour and other "dust" can ignite creating explosions resulting from very small particles with a high surface area to volume ratio (thereby making the collective or combined surface area of all the particles very large in comparison to a dust of larger particles) combine with air to create an explosive environment. Generally, dust is defined as powders with particles less than about 500 micrometers μm in diameter, but finer dust will present a much greater hazard than coarse particles by virtue of the larger total surface area of all the particles.

Dusts have a very large surface area compared to their mass. Since burning can only occur at the surface of a solid or liquid, where it can react with oxygen, this causes dusts to be much more flammable than bulk materials. For example, a 1 kg sphere of a material with a density of 1 g/cm$^3$ would be about 27 cm across and have a surface area of 0.3 m$^2$. However, if it was broken up into spherical dust particles 50 μm in diameter (about the size of flour particle), the surface area would increase dramatically such as to 1600 m$^2$ in one embodiment.

This greatly increased surface area allows the material to burn much faster, and the extremely small mass of each particle allows it to catch on fire with much less energy than the bulk material, as there is no heat loss to conduction within the material. When this mixture of fuel and air is ignited, especially in a confined space such as a filtration baghouse, warehouse or silo, a significant increase in pressure is created, often more than sufficient to demolish the structure. Even materials that are traditionally thought of as non-flammable, such as aluminum or iron, or slow burning, such as wood, can produce a powerful explosion when finely divided, and can be ignited by even a small spark. Such metal powders are widely used in fireworks for their dramatic effects.

Below a certain value, the lower explosive limit (LEL), there is simply insufficient dust to support the combustion at the rate required for an explosion. It has been determined that a number that is 20% lower than the LEL is considered safe. Similarly, if the fuel/air ratio increases above the upper explosive limit, there is insufficient oxidant to permit combustion to continue at the necessary rate. It is advantageous to prevent dust from reaching sufficient concentrations to avoid explosions.

For the explosion to occur, there has to be an ignition source. For example, static electricity is a major cause of fires and explosions in many industries. The hazard of electrostatic spark ignition of flammable vapor can be minimized by taking actions to limit the accumulation of electrostatic charges to safe values. Of primary importance is the proper bonding and grounding of equipment and containers. However, dust filtration, pollution-control filters, because of their large surface area, can generate as much as 200 times the electrostatic charge generated in the same piping system without filtration. Additionally, filters with conductive properties can be used to dissipate static electricity to reduce the ignition source for fires and explosions.

For example, United States Patent Application Publication 2011/0265312 is directed to a filter medium with improved conductivity. However, this reference uses a conductive coating which is disposed on the filtration substrate using a variety of techniques. For example, in one embodiment, the filtration substrate can be saturated with the conductive coating. In another embodiment, the conductive coating can be painted or extruded onto the filtration substrate. In another embodiment, the filter media can include a bonding agent that bonds the conductive coating to the filtration substrate. The bonding agent can be formed from, for example, a polymer such as polyvinylidene chloride, acrylic latex, polyurethane dispersion, polyvinyl acetate, polyvinyl alcohol, and combinations thereof. The bonding agent can also optionally be conductive. Each of these methods requires a process to add material to the underlying filter substrate. Further, the coating is just that, a coating, and can be worn off or otherwise separated from the filer substrate undermining the utility of this reference.

Another attempt to create a conductive filter is described in United States Patent Application Publication 2008/0230464 which includes a textile substrate (with a defined first side and a second side and a machine and cross-machine direction), where the conductive pattern on the first side is in registration with the conductive pattern on the second side of the textile substrate. However, this reference is limited to the use of two conductive patterns that must have a continuous conductive pathway between the two patterns and across the textile substrate.

Accordingly, an object of the present invention is to provide a homogeneous pleatable filter media.

Still another object of the present invention is to provide a conductive homogeneous pleatable filter media with improved filtering efficiency and air permeability.

SUMMARY OF THE INVENTION

The above objectives are accomplished according to the present invention by providing a filter media and a method of manufacturing the filter media for manufacturing pleated filters comprising a non-woven, needle punch felt including a blend of a first polyester fiber and a bi-component fiber wherein said bi-component fiber has a sheath and a core wherein said sheath has a melting point above 110° C., wherein said first polyester fiber and said bi-component fiber are entangled by needle punching in one manufacturing step and said non-woven needle punched felt is stiffened by applying heat and pressure to the non-woven felt between rollers in another manufacturing step and said nonwoven felt has an efficiency of greater than 89% for a particle size of 3 to 10 µm as determined by testing method ASHRAE 52.2. The filter media can include a top portion and a bottom portion manufactured from a web made from a carding process that is cross lapped, cut and overlapped so that said top portion and said bottom portion are entangled by a needle punching process. The filter media can have an efficiency of greater than 88% for a particle size of 1 to 3 µm as determined by testing method ASHRAE 52.2.

A scrim can be placed between said top and bottom portions prior to the needle punching process so that said scrim is integrated into said nonwoven felt. The scrim can be a conductive scrim having a grid of conductive fibers.

The filter media can be embossed wherein one roller is an embossing roller that contacts said nonwoven felt on one side to form an embossed pattern on that side. The embossing roller can include a pattern of diamonds having dimensions of 0.25 to 3.0 mm$^2$ transferred from a single patterned embossing roll having a negative of said pattern. Each of the rollers can include a pattern that is transferred from said rollers to each side of said non-woven felt.

DESCRIPTION OF THE DRAWINGS

The construction designed to carry out the invention will hereinafter be described, together with other features thereof.

FIG. 4 is a pattern that can be included in the invention;

DESCRIPTION OF A PREFERRED EMBODIMENT

Figure 1:
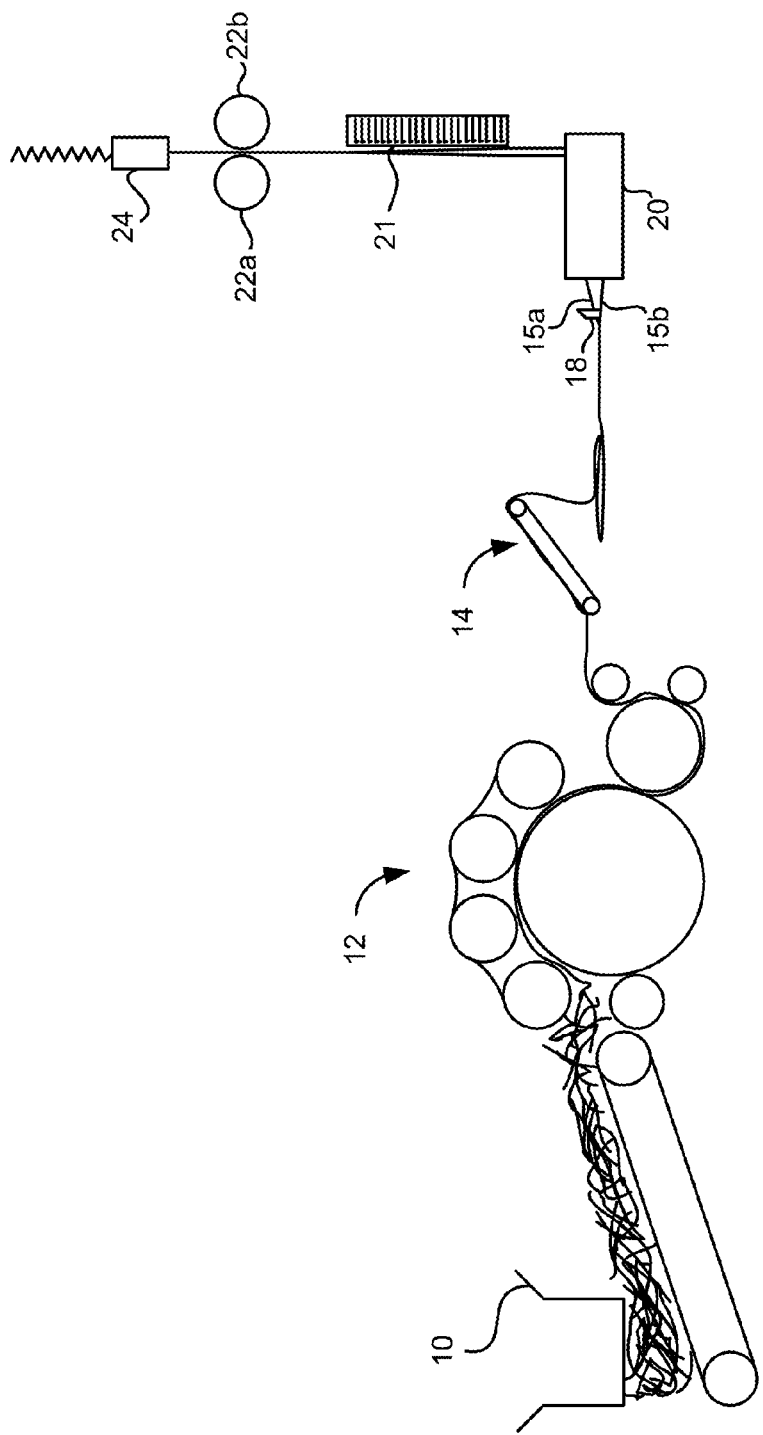
FIG. 1 is a schematic of the process for manufacturing the filter media.

Referring to FIG. 1, the method of manufacturing the filter media is described in more detail. A hopper 10 contains raw staple fiber or blend that can include polyethylene, polypropylene, nylon, polyester, acrylic, carbon, PPS, meta-aramid, para-aramid, polyimide (P84), PTFE, glass, Belcotex, and any combination of these. In one embodiment, the non-woven fabric can also be made from a polymeric fiber, copolymer or blend. The copolymer can have a core and a sheath. The sheath can have a melting point lower than that of the core and can have a melting point above 110° C. The core and sheath can be made from polyester. In one embodiment, the filter media can be a blend of a first polyester fiber and a bi-component fiber wherein said bi-component fiber has a sheath and a core.

The blend is then carded by carding machine 12 to produce a web 14. The web can then be overlapped to provide for a top portion and a bottom portion. The top portion and a bottom portion can be from the web that is made from the carding process that is cross lapped by lapper 16, cut by cutter 18 and overlapped by overlapper 20. The top portion and bottom portion can then be needled by a needling loom to provide a homogeneous filter media. The filter media can then pass through rollers 22a and 22b that apply heat pressure to the filter material to add stiffness to the filter material. The filter material, after being stiffened by the rollers, can then be pleated at 24. Note that the rollers apply heat and pressure to the filter material after the material has been needle punched to integrated the two layer into a homogenous structure.

Figure 2:
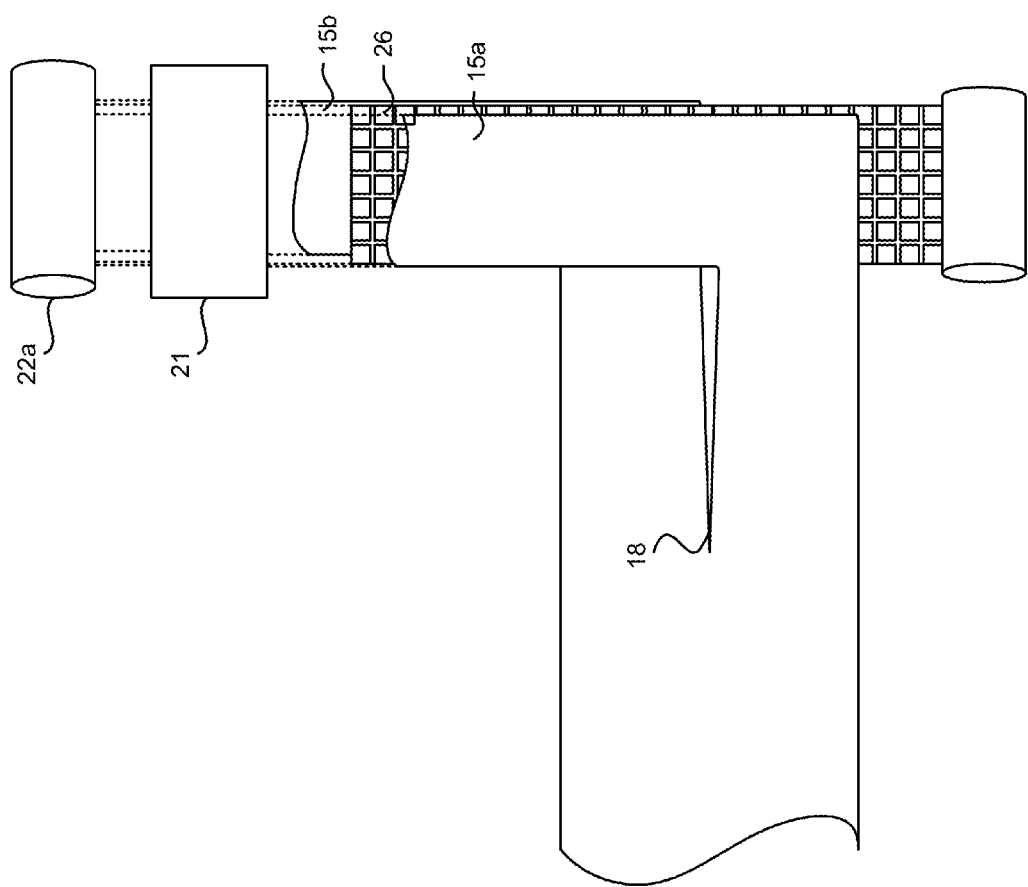
FIG. 2 is a schematic of the process for manufacturing the filter media.

Referring to FIG. 2, a scrim 26 can be placed between the top and bottom portions prior to the top and bottom portions passing through the needle punch process. In an embodiment, the scrim may include a conductive portion. The conductive portion of the scrim can be made from material that includes silver, copper, gold, aluminum, zinc, nickel, brass, bronze, iron, platinum, steel, lead, stainless steel, and any combination of these.

Figure 3:
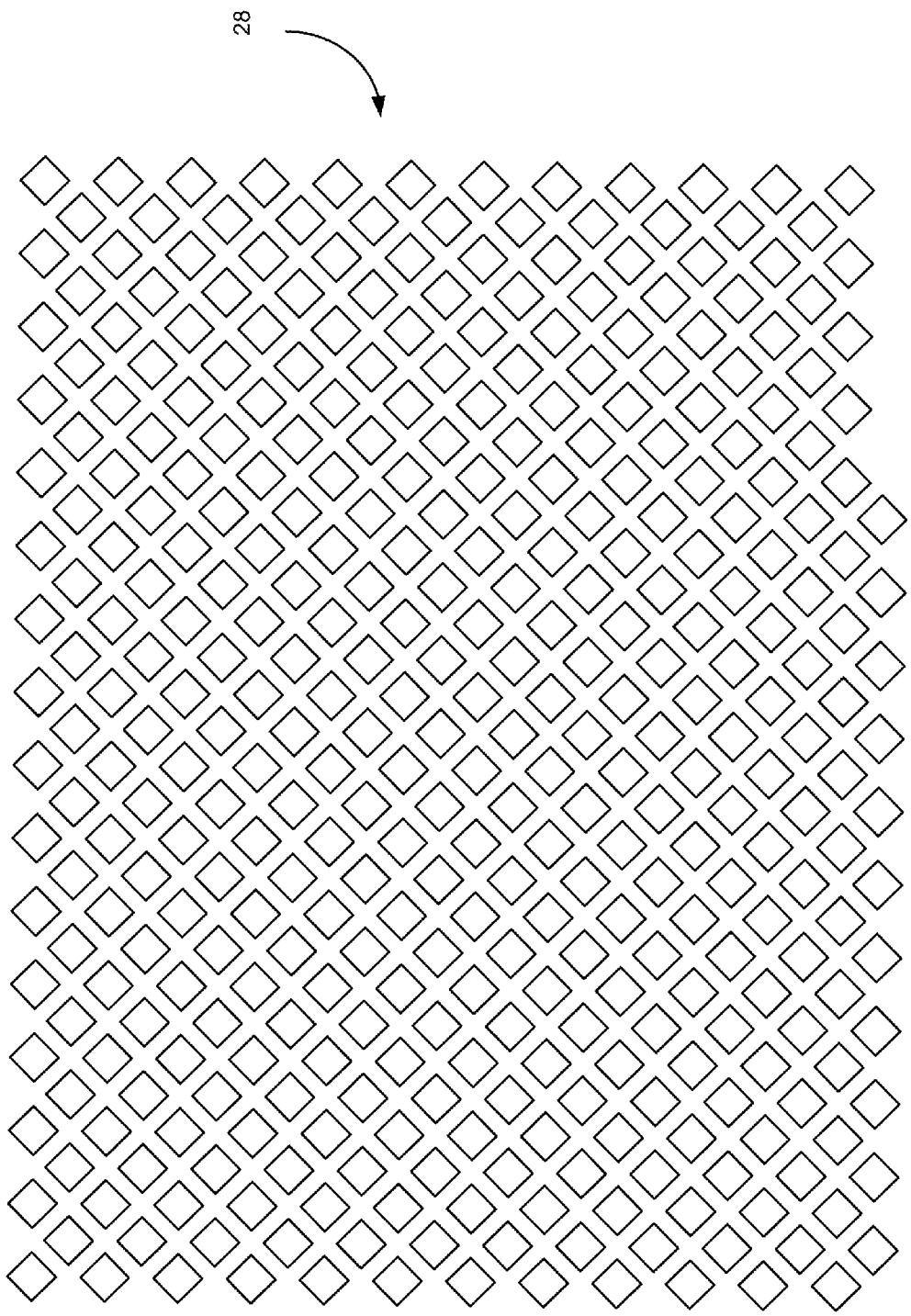
FIG. 3 is a pattern that can be included in the invention.

Referring to FIG. 3, in one embodiment, one of the rollers can include a pattern 28 that is imposed upon one side of the filter media after the filter media is needle punched. The pattern can be a diamond pattern having dimensions between 0.25 to 3.0 mm$^2$. This embodiment, using the diamond pattern, can provide efficiency of at least 29% for a particle size of 0.3 to 1.0 µm, at least 75% for a particle size of 1.0 to 3.0 µm and; at least 98% for a particle size of 3.0 to 10.0 µm; as determined by testing method ASHRAE 52.2. The diamond pattern can be a small pattern with dimensions of 0.4 mm$^2$ or a large diamond pattern. The diamond pattern can be made using a top roller with a part of a diamond pattern and the bottom roller with the remaining part of the diamond pattern. One roller can be smooth.

Figure 5:
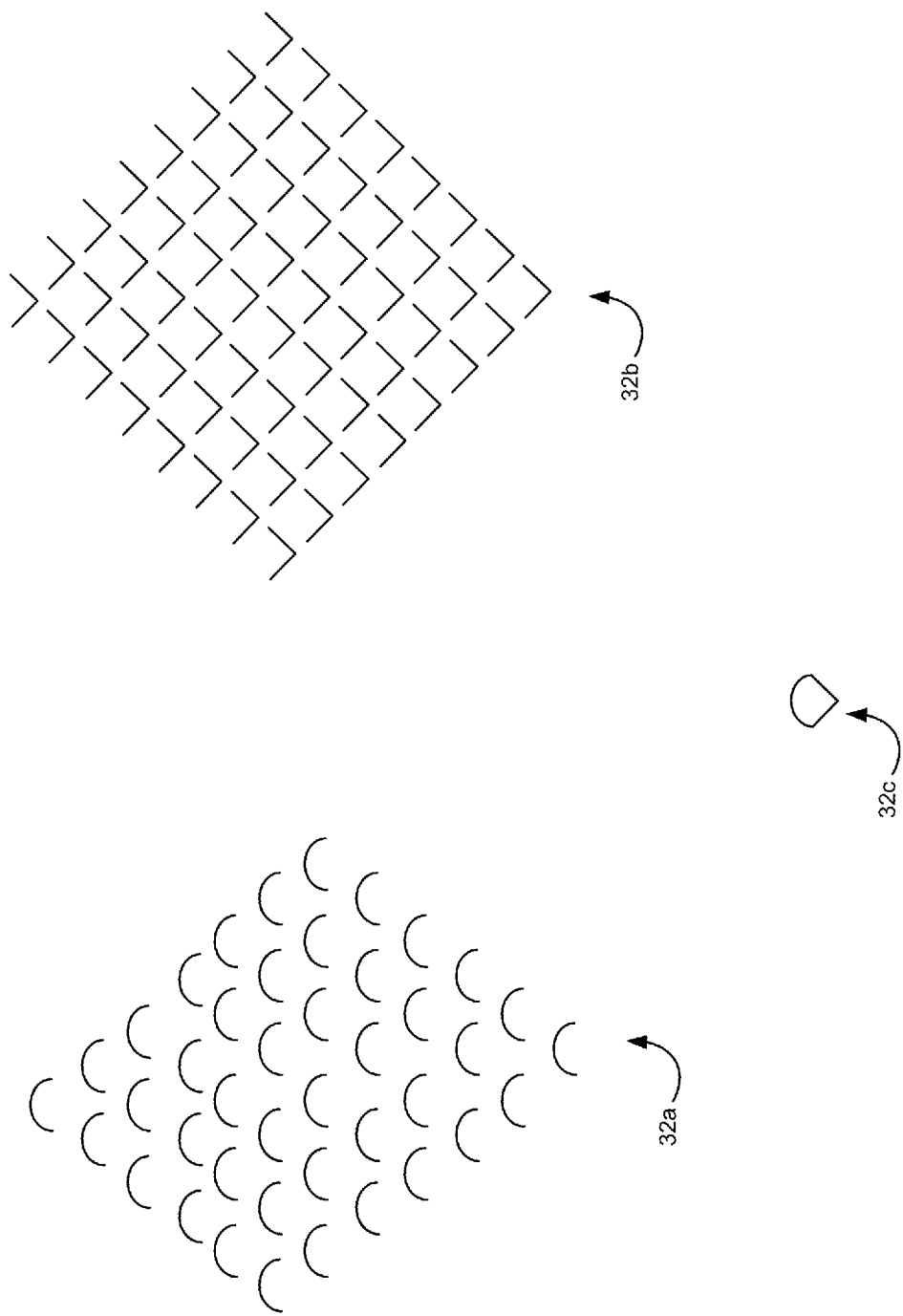
FIG. 5 is a pattern that can be included in the invention.

The pattern on the roller can be a pattern that is a pattern or includes as a portion of the pattern, a shape taken from the group including a circle, square, rectangle, triangle, diamond, oval, semi-circle, asymmetrical shape, or any portion thereof or any combination thereof. Referring to FIG. 4, there can be a first pattern 30 a on the top roller and a second pattern 30 b on the bottom roller. When the rollers imprint the patterns on the filter media, the patterns can cooperate to produce the shape shown as 30 c. Referring to FIG. 5, there can be a first pattern 32 a on the top roller and a second differing pattern 32 b on the bottom roller. When the rollers imprint the patterns on the filter media, the patterns can cooperate to produce the shape shown as 32 c.

In these various configurations, the filter media can have an efficiency of greater than 88% for particle size from 1 to 3 µm as determined by testing method ASHRAE 52.2. The filter media can have a Minimum Efficiency Rating Value (MERV rating of about 10 and an air permeability of about 16 ft$^3$/min. In one embodiment, the filter media can include an efficiency of at least 19% for particles sizes of 0.3 to 1.0 µm; at least 62% for particle sizes of 1.0 to 3.0 µm and at least 89% for particle sizes of 3.0 to 10.0 µm as determined by testing method ASHRAE 52.2.

The filter media herein can be provided with the following physical properties as shown in TABLE 1.

TABLE 1

| Blend | Initial Resistance (W.G., in.) | Composite Avg Particle Size Efficiency (%) | | | MERV RATING | Sample Data | | |
|---|---|---|---|---|---|---|---|---|
| | | E1 0.3-1 Micron | E2 1-3 Micron | E3 3-10 Micron | | Weight (oz/sy) | Perm (cfm) | Thickness (in) |
| Small Pattern, 4-den Bico - 1 | 0.64 | 14% | 62% | 99% | 10 | 9.8 | 19.0 | 0.032 |

TABLE 1-continued

| Blend | Initial Resistance (W.G., in.) | Composite Avg Particle Size Efficiency (%) | | | MERV RATING | Sample Data | | |
|---|---|---|---|---|---|---|---|---|
| | | E1 0.3-1 Micron | E2 1-3 Micron | E3 3-10 Micron | | Weight (oz/sy) | Perm (cfm) | Thickness (in) |
| Small Pattern, 4-den Bico - 2 | 0.65 | 22% | 80% | 100% | 12 | 10.1 | 17.4 | 0.032 |
| Large Pattern, 3-den Bico - 3 | 0.57 | 26% | 69% | 99% | 11 | 9.4 | 10.3 | 0.033 |
| Large Pattern, 3-den Bico - 4 | 0.76 | 33% | 81% | 99% | 12 | 9.7 | 9.2 | 0.033 |

From the above table using the ASHRAE 52.2 standard, you can see that when the small diamond pattern having dimensions of 0.4 mm$^2$ (Small Pattern) is used the efficiency and air permeability is not as desirable as that of a large diamond pattern having dimensions of 1.0 mm$^2$ (Large Pattern). In the above examples, the blend is a polyester (PET) and a polyester bicomponent and is unsupported, such as being without a scrim. Referring to TABLE 2, other embodiments of the present invention have physical properties as shown:

TABLE 2

| Sample | E1 0.3-1 Micron | E2 1-3 Micron | E3 3-10 Micron | MERV | Dust Holding | AIR PERM |
|---|---|---|---|---|---|---|
| Comparison | 25 | 69 | 94 | 11 | 13.8 | 17 |
| PE/P-UP | 19 | 62 | 89 | 10 | 8.1 | 16 |
| PE/P-SSSPEP | 17 | 56 | 88 | 10 | 11.4 | 23 |
| PE/P-UPSD | 18 | 71 | 99 | 11 | 7.8 | 18 |
| PE/P-UPLD | 29 | 75 | 99 | 11 | 7 | 10 |

Figure 6A:
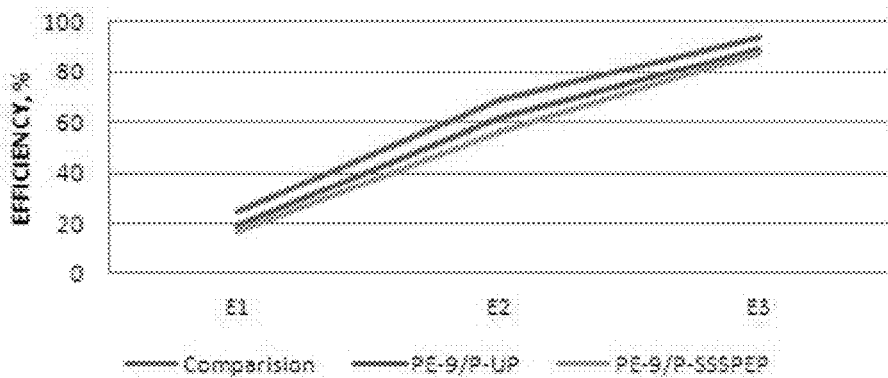
FIGS. 6A and 6B are graphs illustrating physical properties of the filter media; and, FIG. 7 is a flow chart of the manufacturing process for the filter media.
Figure 6B:
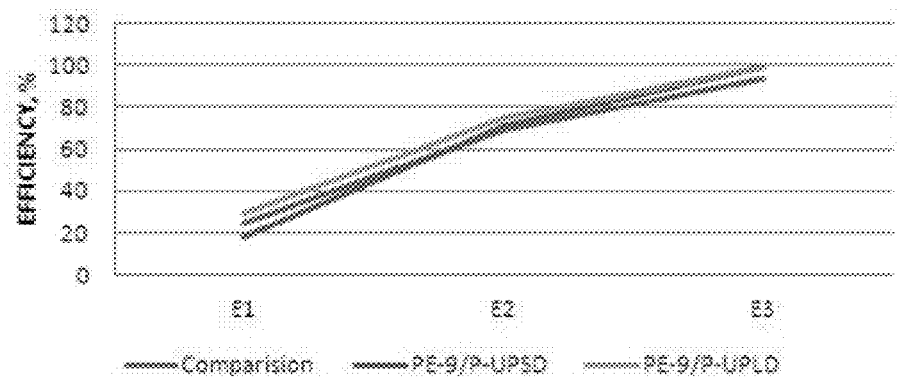

From this table, we can see that the first test sample is a PE/P blend that is unsupported. The next test sample is a PE/P blend with a stainless steel scrim support. The third test sample is a PE/P blend, unsupported, with a small diamond pattern and fourth test sample is a PE/P blend, unsupported, with a large diamond pattern. What is notable is that when tested with a competitive media, such as that claimed in U.S. Pat. No. 6,485,811, the filter media performs slightly less than that of the comparison sample as shown in FIG. 6A. However, once the filter media is embossed with a large diamond pattern, the performance exceeds that of the comparison sample as shown in FIG. 6B. Therefore, the present invention in its large diamond embossed pattern embodiments, adds additional efficiencies over that of the prior art. The embodiment with embossed small diamond pattern adds efficiencies over the prior art at the E2 and E3 particle sizes.

Figure 7:
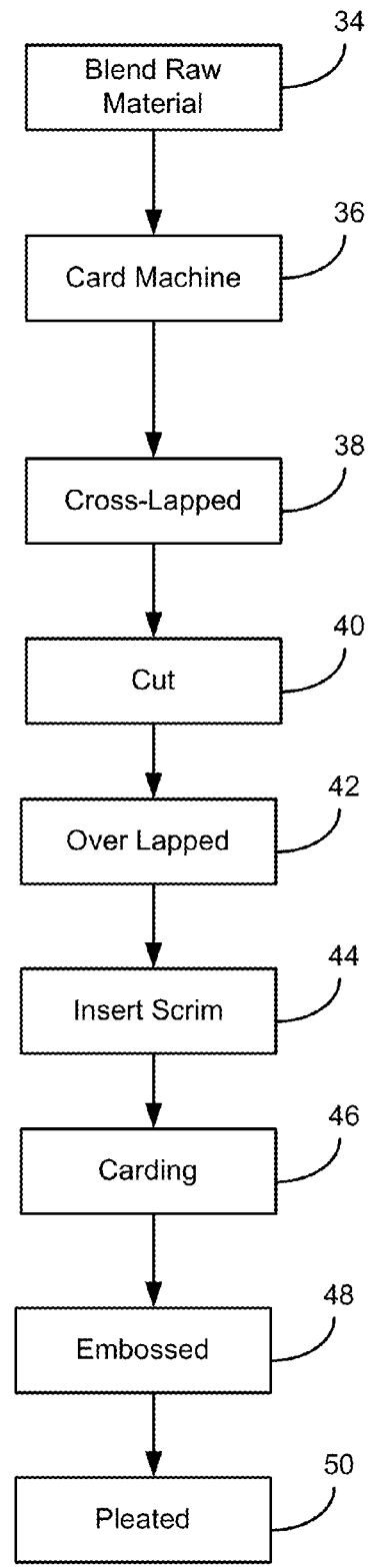

Referring to FIG. 7, the manufacturing process is shown. A blend of staple fiber is provided at 34. The blend is then processed by a carding machine at 36. The web generated from the card machine is then cross-lapped at 38. The resulting web is then cut at 40 and over lapped at 42. In one embodiment, a scrim is inserted between the top portion and bottom portion resulting from cutting the web at 44. The top portion and bottom portion (and in some cases the scrim) is then entangled into a homogenous arrangement by needling at 46. In order to produce a pattern on at least one side of the material, the material can then pass through rollers at 48 that can stiffen the material allowing it to be pleated. In one embodiments, the rollers contain a pattern as herein described. The material can then be pleated at 50.

While a preferred embodiment of the invention has been described using specific terms, such description is for illustrative purposes only, and it is to be understood that changes and variations may be made without departing from the spirit or scope of the following claims.

What is claimed is:

1. A filter media for manufacturing pleated filters, comprising:
    a non-woven, needled felt comprising a blend of a first polyester fiber and a bi-component fiber, said first polyester fiber and said bi-component fiber being entangled by a needle punching process; and
    a conductive scrim integrated into the filter media, wherein said bi-component fiber has a sheath and a core and said sheath has a melting point above 110° C.,
    said felt is stiffened and embossed with a pattern on each side of the felt, and
    said felt has an efficiency of greater than 89% for a particle size of 3 to 10 μm as determined by testing method ASHRAE 52.2.

2. The media of claim 1, further comprising a top portion and a bottom portion manufactured from a web made from a carding process, wherein said media is cross lapped, cut and overlapped so that said top portion and said bottom portion are entangled by a needle punching process to produce a homogeneous arrangement.

3. The media of claim 2, further comprising the scrim placed between said top portion and said bottom portion prior to forming the felt.

4. The media of claim 3, wherein said scrim comprises a grid of conductive fibers.

5. The media of claim 3, wherein said media has an efficiency of greater than 88% for a particle size of 1 to 3 μm as determined by testing method ASHRAE 52.2.

6. The media of claim 1, wherein said pattern comprises a pattern of diamonds having dimensions of 0.25 to 3.0 mm$^2$, and said pattern of diamonds being transferred from a single patterned embossing roller having a negative of said pattern of diamonds.

7. The media of claim 1, wherein said media has a MERV rating of about 10 and an air permeability of about 16 cubic feet per minute.

8. A method of manufacturing a filter media comprising:
    creating a web further comprising a blend of a first polyester fiber and a bi-component fiber using a carding process wherein said bi-component fiber comprises a sheath that has a melting point above 110° C.;
    cross lapping the web;
    cutting said web into a top portion and bottom portion;
    overlapping the top and bottom portion;
    entangling said top portion and said bottom portion to integrate said top portion and said bottom portion into a homogeneous media using a needle punch process;
    placing a conductive scrim between said top portion and said bottom portion prior to entangling said top portion and said bottom portion; and stiffening and embossing said homogeneous media with a pattern on each side of said homogeneous media, wherein said homogeneous media is produced having an efficiency of at least 19% for a particle size of 0.3 to 1.0 μm, at least 62% for a particle size of 1.0 to 3.0 μm, and at least 89% for a particle size of 3.0 to 10.0 μm, as determined by testing method ASHRAE 52.2.

9. The method of claim 8, further comprising embossing one side of said homogeneous media with a diamond pattern.

10. The method of claim 9, wherein said diamond pattern has dimensions of 0.25 to 3.0 mm$^2$.

11. The method of claim 8, wherein said media is produced having the efficiency of at least 29% for the particle size of 0.3 to 1.0 μm; at least 75% for the particle size of 1.0 to 3.0 μm and at least 98% for the particle size of 3.0 to 10.0 μm.

12. The method of claim 8, further comprising pleating said homogenous media.

13. A filter media for manufacturing pleated filters, comprising:

a top portion of a felt cut from a web produced by a carding process, the web having a first polyester fiber and a bi-component fiber, wherein said bi-component fiber has a sheath and a core;

a bottom portion of said felt cut from said web and oriented under said top portion and entangled with said top portion by a needle punch process to form a homogenous filter media; and a conductive scrim, wherein a first side of said homogenous filter media being embossed with a pattern, and further wherein said embossed filter media has an efficiency of greater than 75% for a particle size of 1.0 to 3.0 μm and greater than 98% for a particle size of 3.0 to 10.0 μm, as determined by testing method ASHRAE 52.2.

14. The media of claim 13, wherein said pattern is a diamond pattern having dimensions of 0.25 to 3.0 mm$^2$.

15. The media of claim 13, wherein said filter media is pleated.

16. The media of claim 13, wherein said first polyester fiber is in the range of 5% to 90% by weight of said filter media.

17. The media of claim 13, further wherein the scrim being placed between said top portion and said bottom portion prior to needle punching said top and bottom portions.

18. The media of claim 13, wherein said filter media comprises at least one fiber selected from the group consisting of: nylon, polypropylene, polyethylene, polyester, acrylic, PPS, aramid, polyimide and a fluoropolymer fiber.

* * * * *